United States Patent Office 2,875,126
Patented Feb. 24, 1959

2,875,126

NEW ESTERS OF 5-ACYL-8-HYDROXYQUINO-LINES AND THEIR USE FOR THE CONTROL OF FUNGI

Ernst Hodel and Hans Gysin, Basel, Switzerland, assignors to J. R. Geigy A.-G., Basel, Switzerland, a Swiss firm No Drawing. Application June 8, 1956
Serial No. 590,102

Claims priority, application Switzerland June 16, 1955

5 Claims. (Cl. 167—33)

The present invention is concerned with new esters of 5-acyl-8-hydroxyquinolines, their production as well as the use thereof for the control of fungi. Mixed carbonic acid esters of 5-acyl-8-hydroxyquinolines and any hydroxyl compounds desired have not been known up to now. It has now been found that such compounds of the general formula:

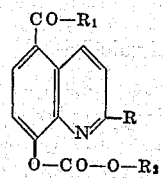

wherein R represents hydrogen or the methyl group, $R_1$ represents an alkyl radical containing at most four carbon atoms or a phenyl radical, which radicals may be halogen-substituted, and $R_2$ represents an alkyl, alkenyl, cycloalkyl, aryl or aralkyl radical, in which radicals any methylene groups present may be replaced by O or S and which radicals may also be substituted by halogen atoms or nitro groups, have an excellent fungicidal activity which is far superior to that of 8-hydroxyquinoline and 8-hydroxyquinaldine and the salts thereof.

Their stability is really good and is surprisingly superior to that of esters of 5-acyl-8-hydroxyquinolines with carboxylic acids.

The new compounds are suitable as active ingredients for fungicidal agents in the most various forms of application. Apart from the fungicidal activity they also have polyvalent bacteriostatic properties and restrict the growth, for example, of staphylococci, streptococci, coli, typhus, paratyphus, enteritis, Gärtner's and dysentery bacilli. Because of this and the strong activity against pathogenic fungi such as, e. g. *Ctenomyces interdigitalis,* they are excellently suitable for human and veterinary medicine and technical disinfection. Due to the slight toxicity for warm blooded animals and lack of phytotoxicity in the concentrations for practical application, the active ingredients which are produced according to the present invention are particularly suitable for plant protection, the excellent activity against powdery apple mildew being of particular interest. The compounds according to the present invention can also be used as active ingredients for dry seed dressings as they have a good action against *Tilletia tritici* and *Fusarium culmorum.*

The new compounds can be produced in good yield by reacting salts of 5-acyl-8-hydroxyquinolines of the general formula:

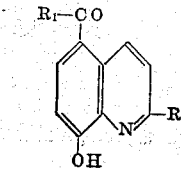

or the free hydroxy compounds, with halogen formic acid esters of the general formula:

wherein Hal represents chlorine or bromine and R, $R_1$ and $R_2$ have the meanings given above, the reaction being performed in the presence of acid binding agents if the free hydroxy compounds are used. The reaction is performed advantageously in an inert anhydrous organic solvent, for example in a hydrocarbon of the benzene series.

According to the size and type of the radical $R_2$, the reaction proceeds sufficiently quickly either at room temperature or in the warm. Advantageously previously formed salts of 5-acyl-8-hydroxyquinolines are used for the reaction such as result for example when the corresponding amount of an alkali hydroxide, e. g. potassium hydroxide is added to the boiling alcoholic solutions thereof.

The compounds which are used as starting materials, 5-acetyl- and 5-benzoyl-8-hydroxyquinoline have been produced by Konomu Matsumura, J. Am. Chem. Soc. 52, 4433–4436 (1930), by condensing 8-hydroxyquinoline with acetyl chloride or benzoyl chloride by means of aluminium chloride in nitrobenzene. Further 5-acyl-8-hydroxyquinolines, the 5-propionyl-, 5-butyryl and 5-isovaleryl-8-hydroxyquinoline, have been produced by K. W. Rosenmund and G. Karst, Archiv der Pharmazie 279, 154–167, in an analogous manner. The following starting materials for example can be produced in an analogous manner:

*8-hydroxyquinolines.*—5-isobutyryl- (M. P. 75–76°), 5-chloracetyl- and 5-(2'-chloro-benzoyl)-8-hydroxyquinoline (M. P. 124–126°);

*8-hydroquinaldines.*—5-acetyl- (M. P. 82–83°), 5-propionyl- (M. P. 97–98°), 5-butyryl- (M. P. 79–81°), 5-isovaleryl- (M. P. 63–64°), 5-benzoyl- (M. P. 110–111°), 5-(2'-chloro-benzoyl)-8-hydroxyquinaldine (M. P. 125–126°).

Examples of halogen formic acid esters are the chloroformic acid esters of methanol, ethanol, β-chlor-ethanol, propanol, isopropanol, n-butanol, isobutanol, sec. butanol and amyl alcohol, isoamyl alcohol, hexanol, 2-ethyl hexanol, dodecanol, allyl alcohol, methallyl alcohol, cyclohexanol, methyl cyclohexanol, phenol, 2- and 4-chloro-phenol, 2.4- and 3.4-dichloro-phenol, o- and p-cresol, 4-tert. butyl and 4-di-isobutyl phenol, benzyl alcohol, methoxy ethanol, ethoxy ethanol, n-butoxy ethanol, ethoxy ethoxy ethanol, methyl mercapto ethanol, phenoxy ethanol, 2-chloro-phenoxy ethanol, 4-chloro-phenoxy ethanol, phenyl mercapto ethanol, 2-nitro- and 4-nitro-phenyl mercapto ethanol, glycide, tetrahydrofurfuryl alcohol and and acetone glycerine.

The following examples illustrate further the production of the new compounds. Parts are given as parts by weight and their relationship to parts by volume is as that of grammes to cubic centimetres. The temperatures are given in degrees centigrade.

*Example 1*

24 parts of chloroformic acid ethyl ester are added dropwise within one hour while stirring to 45 parts of the potassium salt of 5-aceto-8-hydroxyquincline suspended in 120 parts by volume of boiling absolute benzene. To complete the reaction the mixture is stirred for 1–2 hours at the boiling temperature of the benzene until the yellow colour of the potassium salt of 5-aceto-8-hydroxyquinoline has disappeared. The mixture is filtered under suction hot and the remaining almost colourless potassium chloride is washed with 250 parts by volume of warm benzene. The filtrates are united, reduced to half the volume in the vacuum and cooled whereupon the ethyl-[5-aceto-quinolyl-(8)]-carbonate is crystallised out by the addition of 50 parts by volume of petroleum ether. The precipitated crystal mass which is almost white melts at 79–80°. The substance is obtained in the form of white prisms which melt at 80–81° by recrystallisation from a mixture of benzene and petroleum ether 1:2.

*Example 2*

40 parts of chloroformic acid-(4-chlorophenyl)-ester are added dropwise within 1–1½ hours while stirring to 45 parts of the potassium salt of 5-aceto-8-hydroxyquinoline suspended in 200 parts by volume of absolute benzene, the temperature being kept between 20–25° if necessary by slight cooling. The reaction mixture is stirred for about another 5 hours until it has lost its yellow colour. The temperature is then raised to 70° to dissolve any precipitated reaction product, potassium chloride is removed by filtering under suction hot and washed with 50 parts by volume of warm benzene. After cooling the united filtrates, (4-chloro-phenyl)-[5-aceto-quinolyl-(8)]-carbonate is obtained as a whitish yellow crystal mass which melts at 103–105°. By recrystallising from a benzene-petroleum ether mixture 3:1, the new compound is obtained in the form of colourless prisms which melt at 104–105°.

The following compounds can be produced in an analogous manner:

1. Methyl-[5-aceto-quinolyl-(8)]-carbonate, M. P. 127–129°.
2. n-Propyl-[5-aceto-quinolyl-(8)]-carbonate, M. P. 49–50°.
3. Isopropyl-[5-aceto-quinolyl-(8)]-carbonate, M. P. 81–82°.
4. Isobutyl-[5-aceto-quinolyl-(8)]-carbonate, M. P. 51–53°.
5. Sec. butyl-[5-aceto-quinolyl-(8)]-carbonate, M. P. 57–59°.
6. n-Amyl-[5-aceto-quinolyl-(8)]-carbonate, oil, B. P.$_{0.13}$ 193–196°.
7. n-Hexyl-[5-aceto-quinolyl-(8)]-carbonate, oil, B. P.$_{0.1}$ 196–199°.
8. (2'-ethyl-hexyl)-[5-aceto-quinolyl-(8)]-carbonate, oil, B. P.$_{0.005}$ 185–187°.
9. n-Dodecyl-[5-aceto-quinolyl-(8)]-carbonate, M. P. 47–49°.
10. ($\beta$-Chloroethyl)-[5-aceto-quinolyl-(8)]-carbonate, M. P. 94–96°.
11. ($\beta$-Methoxy ethyl)-[5-aceto-quinolyl-(8)]-carbonate, M. P. 60–61°.
12. ($\beta$-Ethoxy-ethyl)-[5-aceto-quinolyl-(8)]-carbonate, oil, B. P.$_{0.005}$ 179–183°.
13. ($\beta$-n-Butoxy-ethyl)-[5-aceto-quinolyl-(8)]-carbonate, oil, B. P.$_{0.003}$ 190–195°.
14. ($\beta$-n-Hexyloxy-ethyl)-[5-aceto-quinolyl-(8)]-carbonate, oil, B. P.$_{0.004}$ 191–196°.
15. Allyl-[5-aceto-quinolyl-(8)]-carbonate, oil, B. P.$_{0.12}$ 185–186°.
16. Cyclohexyl-[5-aceto-quinolyl-(8)]-carbonate, M. P. 85–86°.
17. Tetrahydrofurfuryl-[5-aceto-quinolyl-(8)]-carbonate, oil, B. P.$_{0.002}$ 190–195°.
18. (2',2'-dimethyl-dioxolanylmethyl)-[5-aceto-quinolyl-(8)]-carbonate, viscous oil which cannot be distilled.
19. Phenyl-[5-aceto-quinolyl-(8)]-carbonate, M. P. 93–95°.
20. (2'-chlorophenyl)-[5-aceto-quinolyl-(8)]-carbonate, M. P. 63–65°.
21. (2',4'-dichlorophenyl)-[5-aceto-quinolyl-(8)]-carbonate, M. P. 141–143°.
22. (3',4'-dichlorophenyl)-[5-aceto-quinolyl-(8)]-carbonate, M. P. 122–123°.
23. o-Cresyl-[5-aceto-quinolyl-(8)]-carbonate, M. P. 105–106°.
24. p-Cresyl-[5-aceto-quinolyl-(8)]-carbonate, M. P. 93–94°.
25. (4'-di-isobutyl-phenyl)-[5-aceto-quinolyl-(8)]-carbonate, M. P. 119–120°.
26. (2'-methoxy-phenyl)-[5-aceto-quinolyl-(8)]-carbonate, M. P. 109–110°.
27. (4'-nitro-phenyl)-[5-aceto-quinolyl-(8)]-carbonate, M. P. 144.5–145.5°.
28. Benzyl-[5-aceto-quinolyl-(8)]-carbonate, M. P. 75–76°.
29. (4'-chloro-benzyl)-[5-aceto-quinolyl-(8)]-carbonate, M. P. 83.5–84.5°.
30. ($\beta$-Phenoxy-ethyl)-[5-aceto-quinolyl-(8)]-carbonate, M. P. 103–104°.
31. [$\beta$-(2'-Chloro-phenoxy)-ethyl]-[5-aceto-quinolyl-(8)]-carbonate, M. P. 79–81°.
32. ($\beta$-Phenylmercapto-ethyl)-[5-aceto-quinolyl-(8)]-carbonate, M. P. 63–64°.
33. ($\beta$-Benzyloxy-ethyl)-[5-aceto-quinolyl-(8)]-carbonate, oil, B.P.$_{0.03}$ 242–245°.
34. Methyl-[5-n-butyryl-quinolyl-(8)]-carbonate, M. P. 68–69°.
35. Methyl-[5-isovaleryl-quinolyl-(8)]-carbonate, M. P. 85–86°.
36. Phenyl-[5-isovaleryl-quinolyl-(8)]-carbonate, M. P. 107.5–108°.
37. Methyl-[5-chloracetyl-quinolyl-(8)]-carbonate, M. P. 129.5–130.5°.
38. Methyl-[5-benzoyl-quinolyl-(8)]-carbonate, M. P. 138.5–139.5°.
39. ($\beta$-Phenylmercapto-ethyl)-[5-benzoyl-quinolyl-(8)]-carbonate, M. P. 102–103°.
40. Methyl-[5-(2'-chloro-benzoyl)-quinolyl-(8)]-carbonate, M. P. 128.5–129.5°.
41. Ethyl-[5-aceto-quinaldyl-(8)]-carbonate, M. P. 76–78°.
42. Phenyl-[5-aceto-quinaldyl-(8)]-carbonate, M. P. 112.5–113.5°.
43. (2'-methoxy-phenyl)-[5-aceto-quinaldyl-(8)]-carbonate, M. P. 131.5–132.5°.
44. (4'-nitro-phenyl)-[5-aceto-quinaldyl-(8)]-carbonate, M. P. 86–88°.
45. (4'-chloro-benzyl)-[5-aceto-quinaldyl-(8)]-carbonate, M. P. 124–125°.
46. ($\beta$-Phenylmercapto-ethyl)-[5-aceto-quinaldyl-(8)]-carbonate, M. P. 77–78°.
47. Methyl-[5-benzoyl-quinaldyl-(8)]-carbonate, M. P. 178.5–180°.

To produce the fungicidal agents according to the present invention, the new esters of 5-acyl-8-hydroxyquinolines and quinaldines of the formula defined above can be combined for example with solid pulverulent carriers such as, e. g. talc, kaolin, bole, bentonite, chalk, ground limestone and the pulverulent fungicides obtained can be made suspendable in water if desired by the addition of wetting and dispersing agents such as, e. g. sulphite waste liquor or the sodium salt of dibutyl naphthalene sulphonic acid. In these forms of application it is of advantage that the particles of active ingredient should be as small as possible. Also the active ingredients can be dispersed in water with the aid of suitable emulsifiers, e. g. cation active emulsifiers such as quaternary ammonuim compounds, anion active substances such as soap, soft soap, salts of aliphatic sulphuric acid monoesters or aliphatic/aromatic sulphonic acids or non-ionogenic agents such as higher molecular ethylene oxide condensation products, or they can be dissolved in organic solvents, e. g. in chlorinated hydrocarbons such as trichlorethylene or in medium petroleum fractions, possibly with the addition of auxiliary solvents such as acetone or higher ketones. The active ingredients can also be dissolved or dispersed in liquified substances which are gaseous under normal pressure such as, e. g. difluorodichloromethane or fluorotrichloromethane and be distributed in the air according to the present invention in the form of aerosols or as smoke or mist, in particular for example in store rooms and greenhouses.

The following examples further illustrate the production of some fungicidal agents according to the present invention.

*Example 3*

2–5 parts of active ingredient, e. g. ethyl-[5-aceto-quinolyl-(8)]-carbonate, are ground with 98–95 parts of talc. The dust so obtained can be used for example for the disinfection of bedding earth as well as for dusting plants or parts thereof such as bulbs or tubers.

If the amount of active ingredient is increased to 15–20 parts, e. g. 15 parts of the above named compound and some adhesive agent is added, then a strongly fungicidal dry seed dressing is obtained which at the same time is non-toxic and non-irritant and does not affect germination.

*Example 4*

By grinding together 10 parts of active ingredient, e. g. methyl-[5-aceto-quinolyl-(8)]-carbonate and 82 parts of kaolin or chalk and mixing with 8 parts of wetting and dispersing agents, e. g. 8 parts of sulphite waste liquor, a concentrate is obtained which on mixing with water produces a fungicidal spray which is excellently suitable for the treatment of parts of plants above the ground.

*Example 5*

By mixing of 20 parts of active ingredient, e. g. allyl-[5-aceto-quinolyl-(8)]-carbonate, 40 parts of xylene and 30 parts of ethylene oxide condensation products of alkyl phenols an emulsion concentrate is obtained which can be used for the preparation of emulsions in plant protection.

A concentrate for the preparation of less strongly wetting emulsions is obtained by mixing 25 parts of active ingredient, e. g. n-hexyl-[5-aceto-quinolyl-(8)]-carbonate, 67 parts of xylene and 8 parts of a polyethylene oxide esterified with ricinoleic acid.

*Example 6*

50 parts of active ingredient, e. g. p-cresyl-[5-aceto-quinolyl-(8)]-carbonate are mixed with 10–15 parts of protective colloid, e. g. dried sulphite waste liquor, 5–10 parts of an adhesive agent and, possibly, a wetting agent, and 30 to 35 parts of a pulverulent carrier such as, e. g. kaolin, champagne chalk or bentonite and finely ground in a Kolloplex mill (particle size about 20–30μ). The spray powder obtained from 0.1 to 0.5% suspended in water is excellently suitable for the control of powdery apple mildew.

*Example 7*

50 parts of active ingredient, e. g. (4'-chlorophenyl)-[5-aceto-quinolyl-(8)]-carbonate are mixed with 10–20 parts of liquid sulphite waste liquor and 30–40 parts of water. The mixture is ground for a considerable time in a ball mill or is passed several times through a roller frame, or it can, however, be intensively stirred with 150–200 parts of sand for about 20 hours. In the latter case, the sand is removed by suction through a metal sieve whereupon a 50% spray paste is obtained, the particles of which are less than 3μ. 0.1% to 0.2% of such pastes suspended in water can be used to control fungi, in particular in orchards.

*Example 8*

A wettable powder of the type described in Example 6 containing 50% of active ingredient was sprayed in various concentrations on young wheat plants. 3 pots with totally 60 plants were used for every concentration and the control.

Wheat plants heavily infested with *Erysiphe graminis* were shaken above the pots with the plants to be treated. The infestation of the latter with the fungi occurred immediately.

The first spraying was made when the plants were 6–7 cm. high, the second when they were 15 cm. high (about a week later).

The effect of this treatment was evaluated 8 days after the second spraying.

RESULTS

| Active ingredient | Concentration, percent | Effect |
|---|---|---|
| Ethyl-[5-aceto-quinolyl-(8)]-carbonate. | 0.1 | free from any infestation. |
| | 0.05 | very weak infestation. |
| | 0.01 | Do. |
| | 0.005 | weak infestation. |
| | 0.001 | moderate infestation. |
| | | Control: heavy infestation of whole plant. |
| Methyl-[5-aceto-quinolyl-(8)]-carbonate. | 0.1 | very weak infestation. |
| | 0.01 | weak infestation. |
| | | Control: heavy infestation of whole plant. |

What we claim is:

1. An ester of a 5-acyl-8-hydroxyquinoline corresponding to the formula

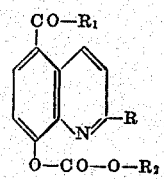

wherein R represents a member selected from the group consisting of hydrogen and methyl, $R_1$ represents a member selected from the group consisting of lower alkyl, lower halogenalkyl, phenyl and halogenphenyl, and $R_2$ represents a member selected from the group consisting of alkyl, halogenalkyl, alkoxyalkyl, aralkyloxyalkyl, arylmercaptoalkyl, aryloxyalkyl, alkenyl, cycloalkyl, tetrahydrofurfuryl, aryl and aralkyl radicals.

2. Methyl-[5-aceto-quinolyl-(8)]-carbonate.

3. Ethyl-[5-aceto-quinolyl-(8)]-carbonate.

4. A fungicidal composition comprising as active ingredient an ester of a 5-acyl-8-hydroxyquinoline as claimed in claim 1, in an amount sufficient to inhibit the growth of fungi, and an inert solid powder as a carrier and a wetting and dispersing agent.

5. β - Phenyloxy - ethyl - [5 - aceto - quinolyl - (8)]-carbonate.

References Cited in the file of this patent
UNITED STATES PATENTS
355,842    Schmitt _____ Jan. 11, 1887

OTHER REFERENCES
JACS (Matsuma), vol. 52, pp. 4433–4436 (1930).